United States Patent [19]

Van Rosmalen et al.

[11] Patent Number: 5,014,254

[45] Date of Patent: May 7, 1991

[54] MAGNETO-OPTICAL RECORDING METHOD AND MAGNETO-OPTICAL RECORDING APPARATUS

[75] Inventors: Gerard E. Van Rosmalen; Bernardus A. J. Jacobs; Johannes H. M. Spruit, all of Eindhoven, Netherlands

[73] Assignee: U.S. Philips Corporation, New York, N.Y.

[21] Appl. No.: 285,184

[22] Filed: Dec. 15, 1988

[30] Foreign Application Priority Data

May 9, 1988 [NL] Netherlands ............... 8801205

[51] Int. Cl.[5] .............. G11B 11/12; G11B 13/04
[52] U.S. Cl. .................... 369/13; 369/114; 360/59
[58] Field of Search ............ 369/13; 360/59, 114; 365/122

[56] References Cited

U.S. PATENT DOCUMENTS

4,466,004 8/1984 Kobayashi et al. ............ 360/59 X
4,712,203 12/1987 Saito et al. .................... 360/114 X Primary Examiner—Stuart S. Levy
Assistant Examiner—Hoa Nguyen
Attorney, Agent, or Firm—John Francis Moran

[57] ABSTRACT

A method and apparatus are revealed for recording information on a record carrier (1) having a magneto-optical recording layer (2), a pattern of magnetic domains (23, 24) having a first and a second direction of magnetization being formed in the recording layer (2). In accordance with the method, areas (22) of the recording layer are heated by the radiation pulses (20). The heated areas (22) are magnetized by means of a coil (12) which is energized with energizing-current pulses (21) which lag the radiation pulses (20) to such an extent that cooling of the areas (22) takes place substantially during the generation of the energizing pulses (12).

13 Claims, 5 Drawing Sheets

MAGNETO-OPTICAL RECORDING METHOD AND MAGNETO-OPTICAL RECORDING APPARATUS

BACKGROUND OF THE INVENTION

The invention relates to a method of recording information on a record carrier having a magneto-optical recording layer, a pattern of magnetic domains having a first and a second direction of magnetization being formed in the recording layer by scanning the recording layer with a radiation beam in order to temporarily heat the recording layer locally, the heated portions of the recording layer being exposed to a magnetic field which is directed substantially perpendicularly to the recording layer and which is generated by means of a coil, the coil being energized with an energizing current which is modulated in conformity with an information signal.

The invention further relates to a magneto-optical recording apparatus for recording information on a record carrier having a recording layer of a magneto-optical material, which recording apparatus comprises an optical system for scanning the recording layer by means of a radiation beam, a coil for generating a magnetic field in the scanned portion of the recording layer, which field is directed substantially perpendicularly to the recording layer, an energizing circuit for generating an energizing current in the coils, which current is modulated in conformity with an information signal.

Such a method and apparatus are known from European Patent Specification EP-A No. 0,230,325. In the known method a constant intensity laser beam is aimed at a rotating magneto-optical disc by means of an optical system to image a radiation spot on the magneto-optical disc. The portion of the magneto-optical disc which is scanned by the radiation spot is heated to substantially the Curie temperature. The heated portion is magnetized by means of a coil which has a core of a soft magnetic material and is arranged opposite the optical system, at the other side of the rotating magneto-optical disc. The coil is energized with an alternating current modulated in conformity with the information signal, is such a way that the heated portion is magnetized in a direction which depends on the instantaneous polarity of the alternating current. The magnetization is preserved after cooling. In this way a pattern of magnetic domains representative of the information signal is formed in the recording layer.

This recording method has the advantage that a previously formed pattern of magnetic domains can be overwritten. In order to achieve an adequate recording velocity a small low inductance coil is used, which is energized with a comparatively large energising current. A problem which then occurs is the substantial heat dissipation in the coil, the coil core and the electronic drive circuitry. This heat dissipation is therefore a restrictive factor in raising the recording velocity and/or increasing the magnetic field strength, for example in order to increase the distance from the coil to the recording layer.

SUMMARY OF THE INVENTION

It is an object of the invention to provide a method as defined in the opening paragraph, which enables the heat dissipation in the coil and/or the electronic drive circuitry to be reduced.

It is another object of the invention to provide an apparatus as defined in the second paragraph, for carrying out the method.

With respect to the method this object is achieved in that the radiation beam is pulse-modulated, in that the coil is energized with energizing-current pulses of a first and a second polarity, the phase relationship between the radiation pulses and the energizing-current pulses being such that cooling the heated portions of the recording layer take places substantially during the generation of the energizing-current pulses.

With respect to the apparatus said object is achieved in that the recording apparatus comprises means for the pulse modulation of the radiation beam, in that the energizing circuit is adapted to generate energizing-current pulses of a first and a second polarity, and in that the recording apparatus further comprises a synchronising circuit for maintaining a predetermined phase relationship between the radiation pulses and the energizing-current pulses.

The invention is based inter alia on the recognition of the fact that if radiation energy is applied in the form of pulses, the temperature throughout the recording layer has decreased to substantially the ambient temperature in the time intervals between the radiation pulses, so that the magnetic field need be generated only during the short time in which the portion heated by the radiation pulse cools. Therefore, the coil has to be energized only briefly, which results in a reduced heat dissipation.

Another advantage of the recording method in accordance with the invention is that during heating of the recording layer the temperature gradient in the boundary region of the magnetic domain to be formed is very high, so that the accuracy with which the boundaries of the magnetic domain are formed is high. When the pattern of magnetic domains is subsequently read, this results in an improved signal-to-noise ratio.

Another advantage of the pulsed supply of the radiation energy is that the laser load is reduced, which leads to a longer service life of the laser.

Further advantage of the pulsed supply of the radiation energy is that the thermal load of the recording layer and hence the rate of ageing of the record carrier, is reduced in comparison with a radiation beam of constant intensity.

A preferred embodiment of the method is characterized in that the time intervals in which the radiation pulses and the energizing current pulses are generated partly overlap one another.

This embodiment has the advantage that the magnetic field is always present at the end of the radiation pulse, at which instant the temperature in the recording layer is maximal, so that the size of the portion heated above the write temperature is also maximal.

Another embodiment of the method is characterized in that the coil is of a type having a core of a non-magnetic material.

If in this embodiment a magnetic field of the same strength is generated the heat dissipation as a result of the resistive losses in the coil turns will be larger than in the case of a coil having a core of a magnetic material, but this is offset by the fact that no heat is dissipated in the core material. When the frequency of the energising current is increased the dissipation in the magnetic material of a coil having a magnetic core will increases at substantially faster rate than the heat dissipation in the coil turns. Indeed, above a specific frequency the heat dissipation in the magnetic material will be very dominant. Therefore, the last-mentioned embodiment of the method is very suitable for high recording velocities owing to the absence of a core of a magnetic material.

An embodiment of a recording apparatus which is very suitable for recording binary information signals having a specific bit rate is characterized in that the synchronizing means are adapted to synchronize the generation of the radiation pulses and of the energising-current pulses with the bit rate of the information signals and in that the means for modulating the energizing current are adapted to generate energizing-current pulses of a polarity dictated by the logic value of the information signal.

An embodiment of the recording apparatus which is very suitable for recording FM modulated signals is characterized in that the synchronizing means comprise an oscillator for generating an FM modulated periodic signal, means for generating radiation pulses in sychronism with the periodic signal, and means for generating energizing-current pulses in synchronism with the periodic signal, in such a way that a number of energizing current pulses of a first polarity always alternates with an equal number of energising current pulses of opposite polarity.

Another embodiment of the recording apparatus is characterized in that the optical system comprises focusing means for focusing the radiation beam, the recording apparatus comprising means for maintaining a predetermined distance between the focusing means and the recording layer in order to focus the radiation beam on the recording layer, and in that the core of the coil is radiation-transmitting and is mechanically coupled to the focusing means, the coil being arranged in such a way that the radiation beam is projected onto the recording layer via the core of the coil.

This embodiment advantageously utilizes the absence of a coil core of a magnetic material. The mechanical coupling between the focusing means and the magnet coil ensures that the distance between the magnet coil and the recording layer is maintained constant during recording. This has the advantage that the conditions under which the heated portion of the recording layer is magnetised are maintained constant in a very simple manner, which is beneficial for the recording quality.

BRIEF DESCRIPTION OF THE DRAWINGS

Further embodiments and the advantages thereof will now be described in more detail hereinafter with reference to FIGS. 1 to 12, of which

DESCRIPTION OF THE PREFERRED EMBODIMENTS

Figure 1:
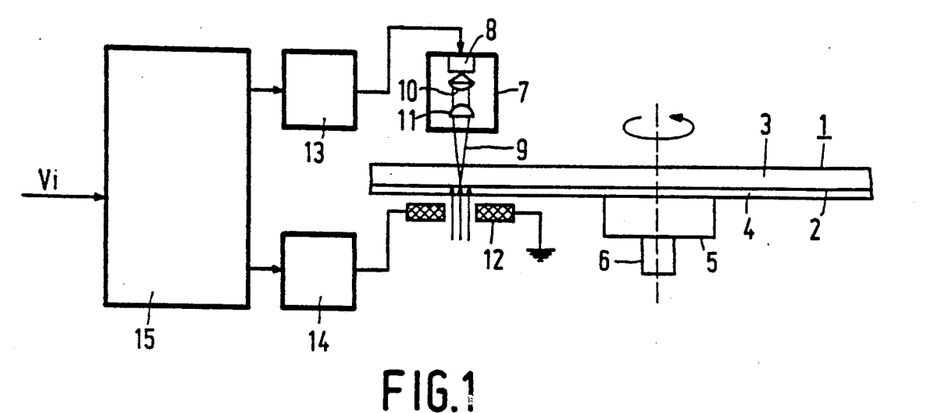
FIG. 1 shows an embodiment of a recording apparatus in accordance with the invention.

FIG. 1 shows an embodiment of an apparatus in accordance with the invention for recording information on a disc-shaped record carrier 1. The record carrier comprises a transparent substrate 3 provided with a magneto-optical recording layer 2 of a customary type, for example as described in "PHILIPS Technical Review", Vol. 42, no. 2, pp. 38–47. The recording layer 2 is covered with a protective coating 4. The apparatus comprises a turntable 5 and a drive motor 6 for rotating the record carrier 1 about its axis. An optical system in the form of a customary optical head 7 is arranged opposite the rotating record carrier 1. The optical head 7 comprises a radiation source in the form of a semiconductor laser 8 for generating a radiation beam which is concentrated to form a tiny radiation spot on the recording layer 2 by means of a system of lenses 10 and 11. At the other side of the record carrier 1, opposite the optical lens 7, a coil 12 is arranged which, when energized, produces a magnetic field which is directed substantially perpendicularly to the portion of the recording layer 2 scanned by the radiation beam 9.

A laser modulation circuit 13 of a customary type produces control pulses for the semiconductor laser 8, so that the laser 8 generates radiation pulses having a length of for example 80 ns. An energizing circuit 14 generates energising current pulses of a first and a second polarity, which energising current pulses are applied to the coil 12. A synchronizing circuit 15 derives from an information signal Vi control signals of equal frequency for the laser modulation circuit 13 and the energizing circuit 14, a fixed relationship being maintained between the control signal, in such a way that the energizing-current pulses are generated with a specific time delay relative to the radiation pulses. The delay time is selected in such a way that the radiation pulses and the energizing-current pulses partly overlap one another. The radiation pulses and energizing pulses thus generated are shown as a function of time in FIG. 2, the radiation pulses bearing the reference numerals 20a, . . . , 20g and the energizing-current pulses bearing the reference numerals 21a, . . . , 21g.

How the control signals for the laser modulation circuit 13 and the energising circuit 14 are derived from the information signal Vi will be described in detail hereinafter. However, first the write process will be described with reference to FIGS. 2 and 3.

Figure 2:
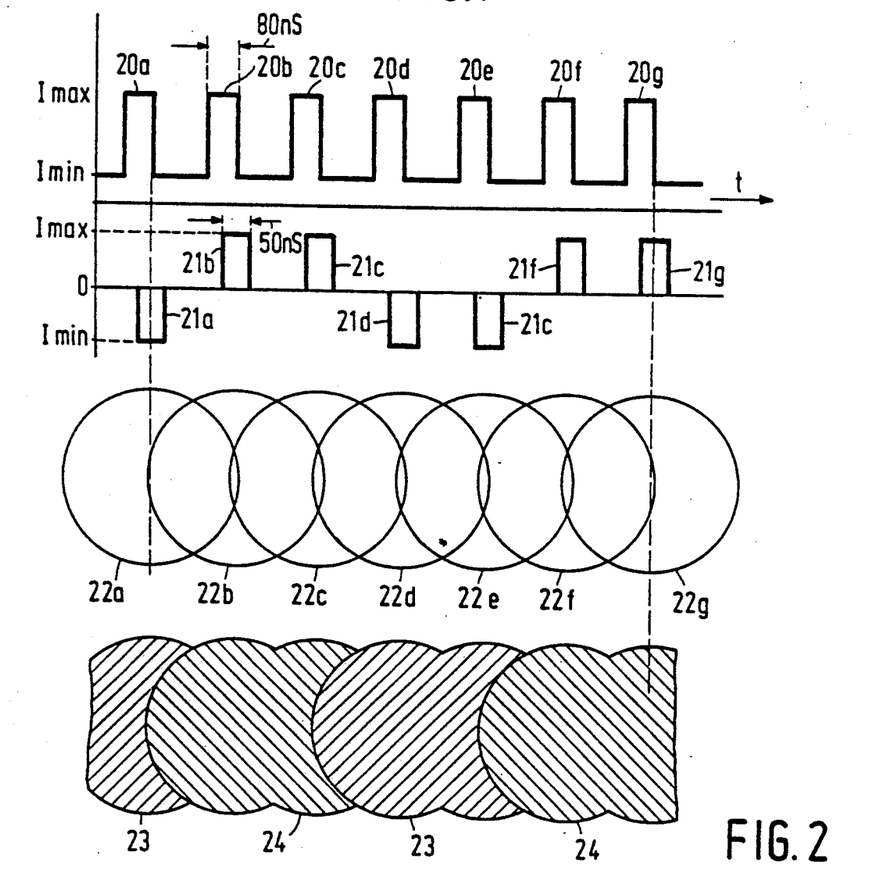
FIGS. 2, 9 and 11 show the intensity of the radiation beam, the energising current for generating the magnetic field and the resulting magnetic-domain patterns for different embodiments of the invention.
Figure 3:
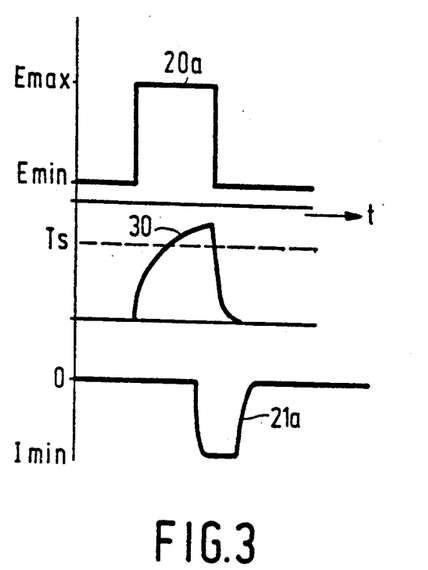
FIG. 3 represents a radiation pulse, the resulting temperature change in the recording layer, and an energising-current pulse as a function of time.

FIG. 3 shows the radiation pulse 20a and the energizing pulse 21a to a highly enlarged time scale. The reference numeral 30 in FIG. 3 indicates the temperature variation as a function of time for the area 22a (see FIG. 2) of the recording layer 2 which is irradiated by the radiation pulse 20a. As a result of the applied radiation energy the temperature in the area 22a rapidly rises above the write temperature Ts, which is the temperature above which the direction of magnetization of the recording layer can be changed by the generated magnetic field. The write temperature Ts is generally situated in the proximity of the Curie temperature of the material of the recording layer.

At the end of the radiation pulse 20a the material cools very rapidly to approximately the ambient temperature as a result of the heat transfer in the recording layer 2.

The delay and the length of the energizing-current pulses 21a have been selected in such a way that cooling of the recording layer takes place during the generation of energizing pulse 21a, so that the area 22a is permanently magnetized in a direction of magnetization defined by the polarity of the energizing current pulse 21. After the area 22a of the recording layer has cooled sufficiently, the generation of the magnetic field is discontinued by termination of the energizing pulse 21 until during the next radiation pulse 20b the area 22b is heated above the write temperature Ts and the area 22b is magnetized as a result of the coil 12 being energized with the energising-current pulse 21b. In the train of energizing-current pulses 21 shown in FIG. 2 the energizing-current pulse 21 has a polarity opposite to the polarity of the energizing-current pulse 21a, so that the direction of magnetization in the area 22b is also opposed to the direction of magnetization in the area 22a. The area 22b partly overlaps the area 22a, so that the direction of magnetization in the overlapping portion of 22a is reversed. After the magnetization of the area 22b the areas 22c, ..., 22g are magnetized by means of the radiation pulses 20c, ..., 20g and the energizing-current pulses 21c, ..., 21g, yielding a pattern of magnetic domains 23 having a first direction of magnetization and domains 24 having a second direction of magnetization as is shown in FIG. 2.

It is to be noted that the direction of magnetization outside the domains 23 and 24 is not indicated in FIG. 2. In reality the recording layer outside said domains is magnetized in one of the two possible directions.

The method of recording information described in the foregoing has the advantage that the coil 12 has to be energized only during the very short cooling period of the areas 20, enabling the heat dissipation as a result of the ohmic losses in the coil turns to be limited. Moreover, this also enables the heat dissipation in the energizing circuit 14 to be limited.

Although the method is also advantageous in the case of coils having cores of a magnetic material it, the use of a coil without a core of a magnetic material is to be preferred at high write velocities. When the core of a magnetic material is dispensed with a larger energizing current will be required for a magnetic field of the same strength, but at very high frequencies this increase is outweighed by the very strong increase of the heat dissipation in the magnetic material occurring when the frequency is increased. Indeed, the heat dissipation in the magnetic material is far more frequency-dependent than the increase of the ohmic losses at increasing frequency.

Figure 4:
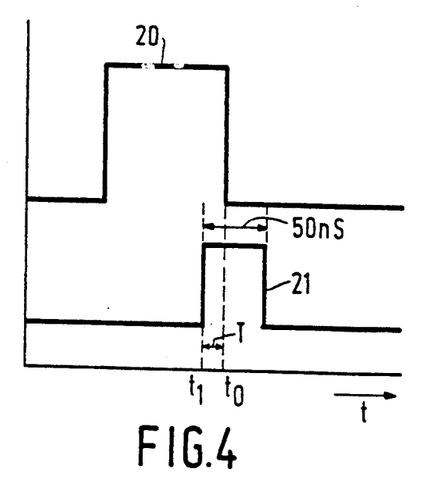
FIGS. 4 and 5 illustrate the effect of the phase difference between the radiation pulses and the energising pulses on the signal-to-noise ratio.
Figure 5:
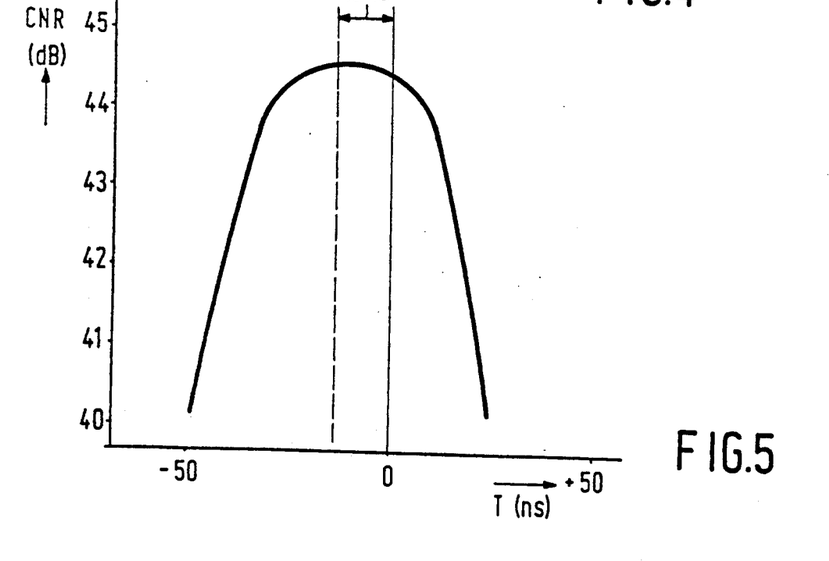

FIGS. 4 and 5 illustrate the effect of the size of the overlap of the radiation pulses 20 and the energizing-current pulses 21 on the signal-to-noise ratio when the pattern of the magnetic domains thus formed is read.

In FIG. 4 the end of the radiation pulse 20 is indicated by t0 and the beginning of the energizing-current pulse is indicated by t1. The time interval t1-t0 is designated by T. FIG. 5 gives the signal-to-noise ratio as a function of the time interval T. A measurement conducted for a pulse width of 50 ns has shown that the signal-to-noise ratio is optimum if the beginning of the energizing current pulse is situated approximately 12 ns before the end of the radiation pulse.

Figure 6:
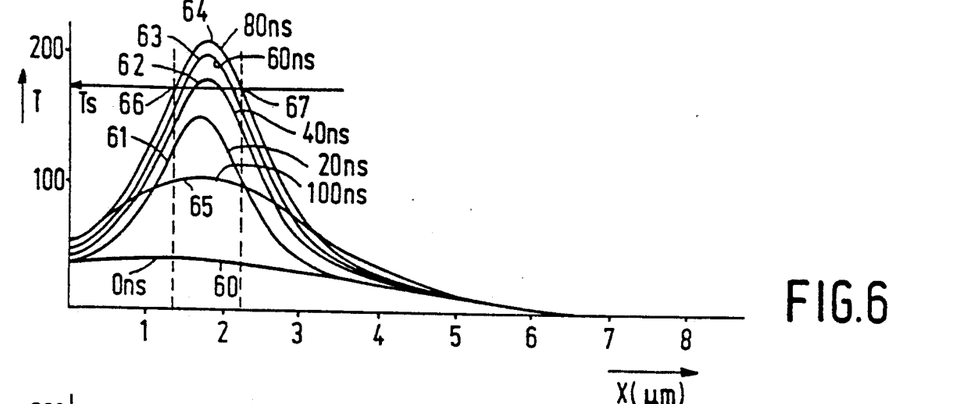
FIGS. 6 and 7 illustrate the temperature variation in the recording layer when this layer is heated with a pulsating radiation beam and with a constant-intensity beam respectively.

FIG. 6 illustrates the temperature variation in the scanning direction (x) in the case that the duration of the radiation pulses is 80 ns, the scanning velocity is 1.2 m/s and the frequency of the radiation pulses is 4.32 MHz.

These values for the frequency and scanning velocity correspond to the customary bit rate and scanning velocity when digital signals are recorded in conformity with the CD standard. The reference numerals 60, 61, 62, 63, 64 and 65 indicate the temperature variation at the beginning of the radiation pulse and 20 ns, 40 ns, 60 ns, 80 ns and 100 ns after the beginning of the radiation pulse. As is apparent from FIG. 6 the temperature rises above the write temperature Ts during the generation of the radiation pulse, until the maximum temperature is reached at the end of the radiation pulse (after 80 ns). After this the temperature decreases very rapidly below the write temperature Ts. For the positional accuracy of the boundaries of the magnetic domain to be formed it is important that the temperature gradient at the location of the domain boundaries is high. The domain boundaries are situated at locations where the temperature of the recording layer intersects the write temperature. In FIG. 6 these locations bear the reference numerals 66 and 67.

It will be appreciated that the influence of fluctuations in ambient temperature, variations in write sensitivity and the magnetic field strength on the positional accuracy of the boundary of the magnetic domain being formed, decreases as the temperature gradient in the boundary region increases.

It is to be noted that the temperature gradient increases as the required energy is applied to the recording layer within a shorter time. Therefore, it is advantageous to select radiation pulses of a small length relative to the pulse repetition time.

Figure 7:
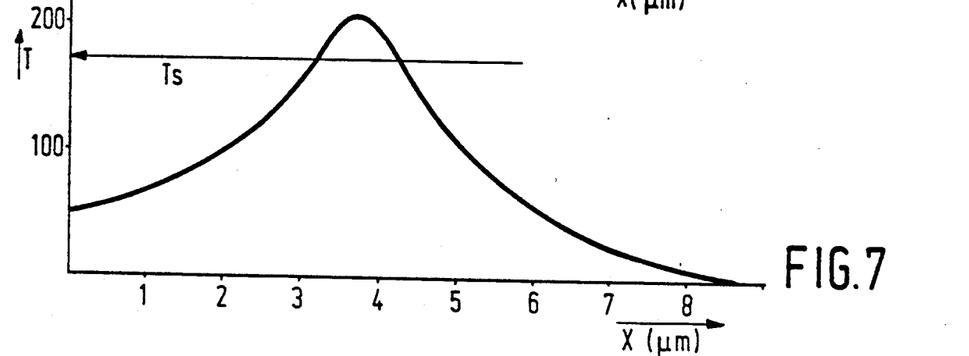

By way of illustration FIG. 7 shows the temperature variation in the recording layer in the case that the recording layer is scanned with a constant-intensity radiation beam. As will be apparent from a comparison of the temperature variations in FIGS. 6 and 7, the temperature gradient in the case of scanning with a constant-intensity radiation beam is substantially lower than in the case of scanning with a pulsed radiation beam.

Figure 8:
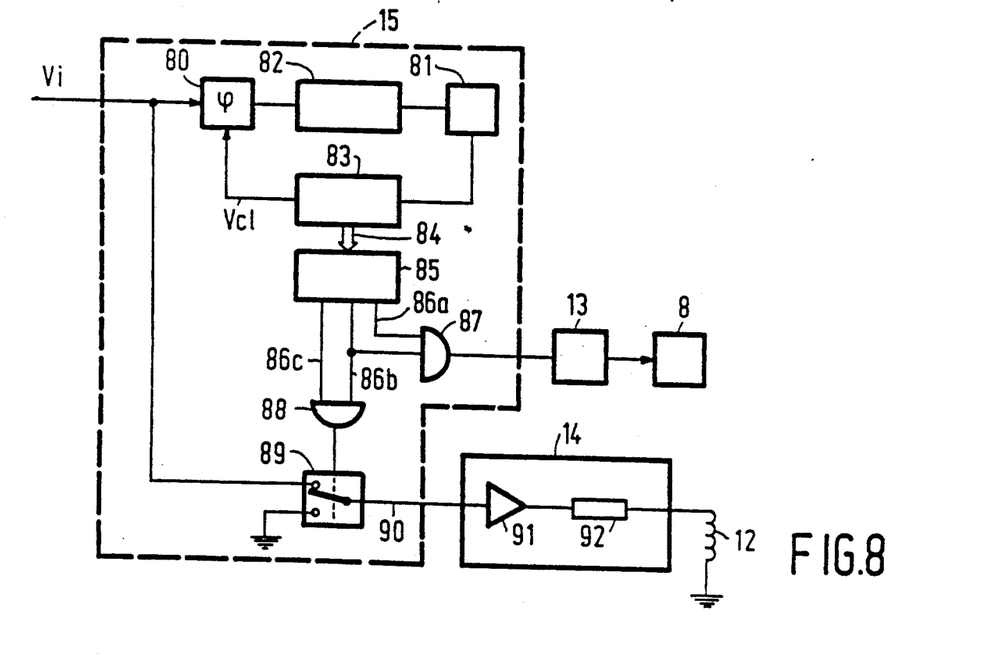
FIGS. 8 and 10 show different synchronising circuits for use in the recording apparatus.
Figure 9:
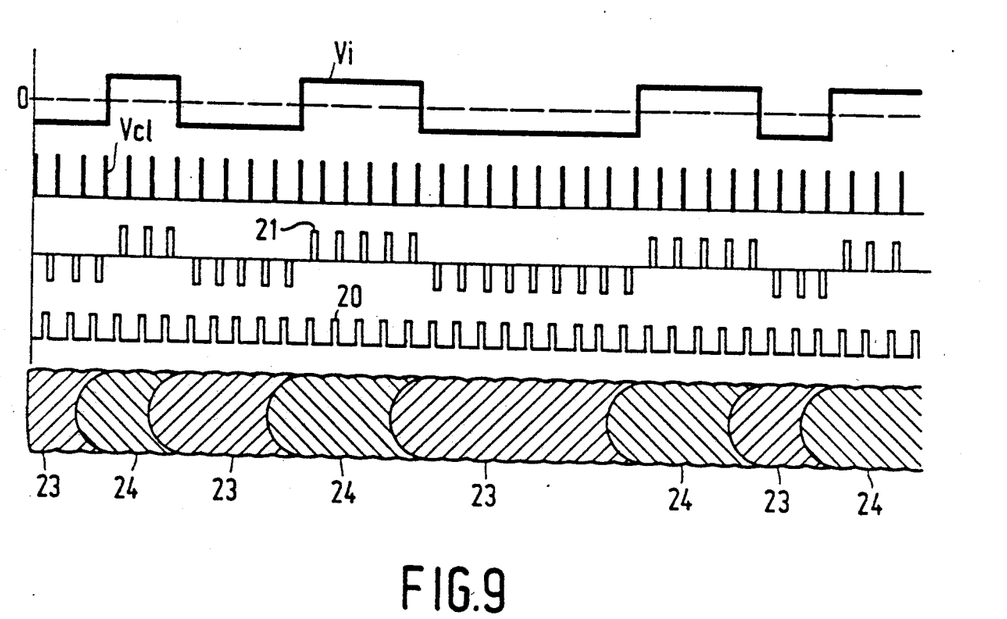

FIG. 8 shows a first example of a synchronizing circuit 15 suitable for controlling the recording process of a digital information signal Vi of a specific bit rate, for example an NRZ modulated signal as shown in FIG. 9. The synchronizing circuit shown in FIG. 8 comprises a circuit for recovering a channel clock signal Vcl of a frequency equal to the bit rate of the information signal Vi. Such a circuit may comprise a phase detector 80 of a customary type which at every zero crossing of the information signal Vi determines the phase difference between this zero crossing and the clock signal Vcl. The phase detector 80 supplies a signal which indicative of the detected phase difference to a voltage controlled oscillator 81 via a loop filter 82. The oscillator generates a periodic signal of a frequency which is an integral multiple of the channel-clock signal Vcl, from which periodic signal the channel-clock signal Vcl is derived by frequency division by means of a counter 83. The phase detector 80, the loop filter 81, the voltage-controlled oscillator 81 and the counter 83 constitute a phase-locked loop circuit of a customary type.

The count of the counter 83 is applied to the decode circuit 85 via a bus 84, which decoder circuit generates three logic "1" signals 86a, 86b and 86c when three consecutive counts are reached. The signals 86a and 86b are applied to the inputs of a two-input AND gate 87. The output signal of the AND gate 87 is applied to the laser modulation circuit 13, which is responsive to every pulse of the output signal of the AND gate 87 to generate a pulse shaped control signal for the laser 8. The signals 86b and 86c are applied to a two-input AND gate 88. The output signal of the AND gate 88 serves as the control signal for an electronic switch 89. The information signal Vi is applied to a first input of the switch 89, a second input of the switch 89 being connected to earth potential. Depending on the logic value of the control signal received from the AND gate 88 the electronic switch 89 connects the output of the switch 87 to the first or to the second input of the switch 89. The resulting signal 90 on the output of the switch 89 comprises a pulse train of a frequency equal to the bit rate of the signal Vi, the polarity of the pulses being dependent upon the instantaneous polarity of the information signal Vi. The signal 90 is applied to the energizing circuit 14. The energizing circuit 14 may comprise, for example, a high power voltage amplifier 91 which generates a voltage proportional to the input voltage of the amplifier 91. The output of the amplifier 91 is connected to the coil 12 via a resistor 92, the resistor 92 serving to limit the energizing current. The resistance value of the resistor 92 and the inductance of the coil 12 are adapted to one another in such a way that the time constant of the RL circuit thus formed is small relative to the pulse width of the energizing-current pulse.

In addition to the information signal Vi and the channel clock signal Vcl FIG. 9 shows the radiation pulses 20 and the energizing current pulses 21 generated by the circuit of FIG. 8 and the resulting pattern of magnetic domains 23 and 24. In the pattern thus formed the portions of the signal Vi having a high signal level are represented by the domains 24 and the portions of the signal Vi having a low signal level are represented by the domains 23.

Figure 10:
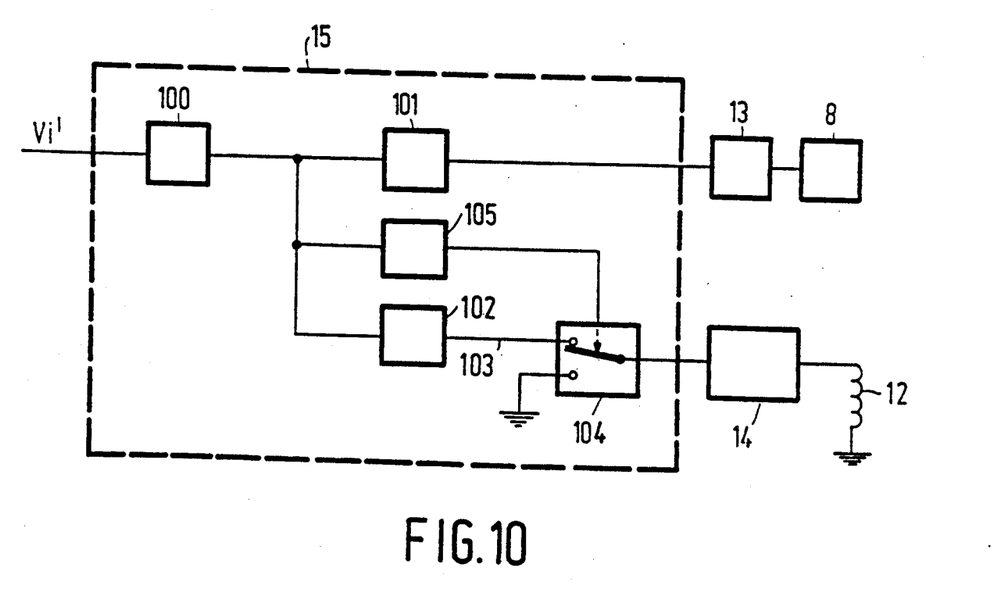
Figure 11:
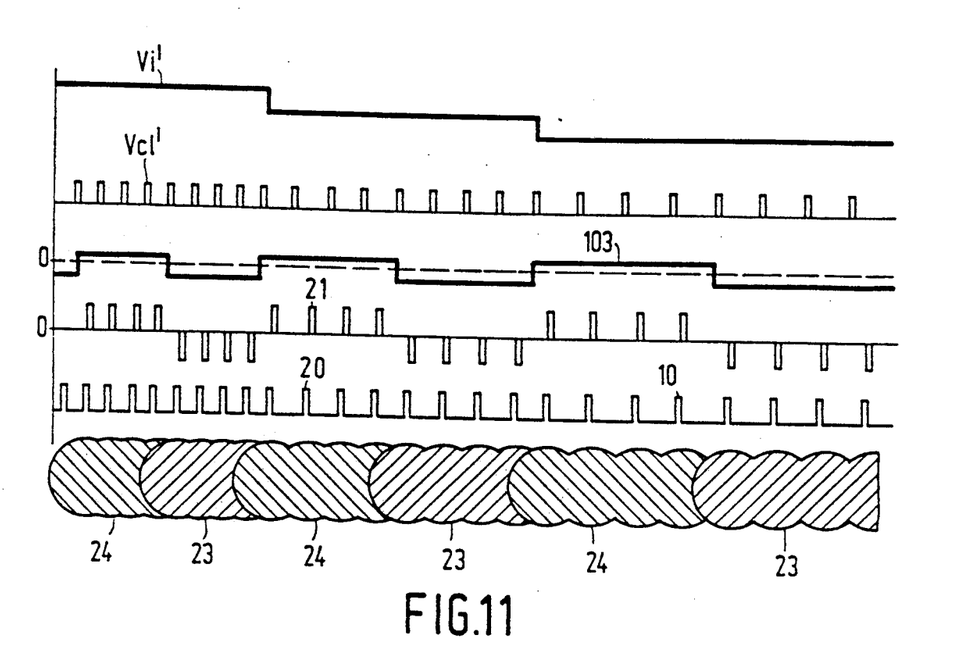

FIG. 10 shows a second example of a synchronizing circuit 15 suitable for recording FM modulated signals. The circuit comprises a voltage controlled oscillator 100 for generating a periodic pulse shaped signal Vcl' whose frequency is modulated in conformity with the input signal Vi'. The signal Vi' and the FM modulated signal Vcl' are shown in FIG. 11. It is to be noted that FIG. 11 shows only three different signal levels for the signal Vi'. However, it will be appreciated that the signal level for the signal Vi' can assume any arbitrary value between a minimum and a maximum level. The control signal for the laser modulation circuit 13 is derived directly from the FM modulated signal Vcl' by means of a delay circuit 101, which delays the signal Vcl' by a specific time. The control signal for the energizing circuit 14 is also derived from the FM modulated signal. For this purpose the synchronizing circuit 15 comprises a frequency divider 102, which derives from the signal Vcl' an NRZ signal 103 having a frequency which is a submultiple of the frequency of the signal Vcl' (for example a quarter). The signal Vi', the signal Vcl' and the output signal 103 of the frequency divider 102 are shown in FIG. 11. The signal 103 is applied to a first input of an electronic switch 104. A second input of the electronic switch 104 is connected to earth potential. The control signal for the electronic switch 104 is derived directly from the signal Vcl' by means of a delay circuit 105. The delay times of the delay circuit 105 and the delay circuit 101 are selected in such a way that the output signal of the circuit 105 lags the output signal of the circuit 101 to such an extent that the beginning of a pulse on the output of the circuit 105 appears before the end of the associated pulse on the output of the circuit 101. FIG. 11 also shows the radiation pulses 20, the energizing pulses 21 and the associated pattern of magnetic domains 23 and 24 obtained by means of the circuit shown in FIG. 10.

The embodiment of the invention shown in FIGS. 10 and 11 advantageously utilises the fact that successive areas 22 overlap one another so that the length of the domains can be changed within specific limits by varying the frequency with which the radiation pulses 20 and the energizing-current pulses are generated. A contiguous domain is always obtained if the spacing between two consecutive pulses is so small that the areas 22 overlap one another.

Figure 12:
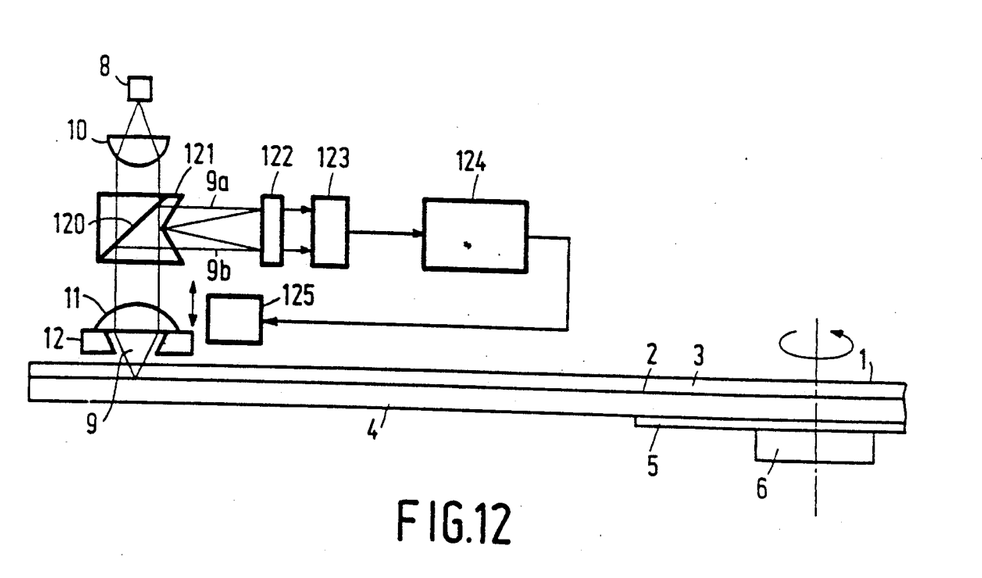
FIG. 12 shows a further embodiment of the recording apparatus in accordance with the invention.

FIG. 12 shows another embodiment of the recording apparatus in accordance with the invention. In FIG. 12 components corresponding to the components in FIG. 1 bear the same reference numerals. The recording apparatus shown in FIG. 12 comprises a focus control system of a customary type comprising the lens 11, a semitransparent mirror 120, a roof prism 121, a system of radiation sensitive detectors 122, a subtractor circuit 123, a control circuit 124, and an actuator 125. The beam reflected from the recording layer 2 is passed to the roof prism 121 by means of the semitransparent mirror 120. The roof prism 121 splits the radiation beam into two sub-beams 9a and 9b which are aimed at the system of radiation sensitive detector 122. With this generally known method the difference in intensity between the sub-beams 9a and 9b is a measure of the focusing error. The subtractor circuit 123 devices a signal which is indicative of said intensity difference from the measurement signals supplied by the detector 122. Said signal is applied to the control circuit 124, which generates such a control signal for the actuator 125 that the actuator 125 keeps the radiation beam in focus on the recording layer 2 by moving the lens 11, which means that the distance between the lens 11 and the recording layer 2 is maintained constant.

If the coil 12 is a coil having a transparent core, for example an air-core coil, the coil 12 may be secured to the underside of the lens 12 in such a way that the radiation beam 9 is aimed at the recording layer via the transparent core of the coil 12. Such a construction has the advantage that the distance between the coil 12 and the recording layer is maintained constant during recording, which means that the conditions under which the area of the recording layer 2 heated by the beam 9 is magnetized always remain constant, which is beneficial for the recording quality.

What is claimed is:

1. A method of recording information on a record carrier having a magneto-optical recording layer, a pattern of magnetic domains having a first direction and a second direction of magnetization being formed in the recording layer by scanning the recording layer with a radiation beam in order to temporarily heat portions of the recording layer locally, the heated portions of the recording layer being exposed to a magnetic field which is directed substantially perpendicularly to the recording layer and which is generated by means of a coil, the coil being energized with an energizing current which is modulated in conformity with an information signal, characterized in that the radiation beam is pulse modulated, in that the coil is energized with energizing current pulses of a first polarity and a second polarity, a phase relationship between the radiation pulses and the energizing current pulses being such that cooling of the heated portions of the recording layer takes place substantially during the generation of the energizing-current pulses wherein the energizing-current pulses are energized after the radiation pulses are energized.

2. A method as claimed in claim 1, characterized in that time intervals in which the radiation pulses and the energizing-current pulses are generated partly overlap one another.

3. A method as claimed in claim 1 or 2, characterized in that the coil is of a type having a core of a non-magnetic material.

4. A method as claimed in claim 1 or 2, characterized in that a duration of the energizing pulses is small relative to a repetition time of the energizing-current pulses.

5. A magneto-optical recording apparatus for recording information on the record carrier having a recording layer of a magneto-optical material, which recording apparatus comprises an optical system for scanning and heating portions of the recording layer by means of a radiation beam having modulated pulses, a coil for generating a magnetic field in the scanned portions of the recording layer, which field is directed substantially perpendicularly to the recording layer, an energizing circuit for generating an energizing current in the coil, which current is modulated in conformity with an information signal, characterized in that the recording apparatus comprises means for generating said modulated pulses of the radiation beam, in that the energizing circuit is adapted to generate energizing-current pulses of a first polarity and a second polarity, and in that the recording apparatus further comprises a synchronizing circuit means for maintaining a predetermined phase relationship between the radiation pulses and the energizing-current pulses wherein the predetermined phase relationship is selected in such a way that the energizing-current pulses lag the radiation pulses to such an extent that the energizing-current pulses and the radiation pulses partly overlap each other.

6. A recording apparatus as claimed in claim 5, for recording a binary information signals having a specific bit rate, characterized in that the synchronizing means are adapted to synchronize the generation of the radiation pulses and the energizing-current pulses with the bit rate of the information signal, and in that the energizing circuit means are adapted to generate energizing current pulses of a polarity dictated by a logic value of the information signal.

7. A recording apparatus as claimed in claim 6, characterized in that the recording apparatus comprises an oscillator for generating a periodic signal, in that the synchronising means are adapted to derive generation instants for the radiation pulses and the energizing-current pulses from the periodic signal, and in that the synchronizing means further comprise means for maintaining a fixed phase relationship between the information signal and the periodic signal.

8. A recording apparatus as claimed in claim 7, characterized in that the apparatus comprises phase-comparison means for determining the phase difference between the periodic signal and the information signal and means for synchronising the information signal with the periodic signal depending on a detection phase difference.

9. A recording apparatus as claimed in claim 5, for recording an FM modulated signal, characterized in that the synchronizing means comprise an oscillator for generating an FM-modulated periodic signal, means for generating radiation pulses in synchronism with the periodic signal, and means for generating energizing-current pulses in synchronism with the periodic signal, in such a way that a number of energizing current pulses of a first polarity always alternates with an equal number of energizing current pulses of an opposite polarity.

10. A recording apparatus as claimed in claims 5, 6, 7, 8, or 9, characterized in that the coil is of a type having a core of a non-magnetic material.

11. A recording apparatus as claimed in claim 10, characterized in that the optical system comprises focusing means for focusing the radiation beam, the recording apparatus comprising means for maintaining a predetermined distance between the focusing means and the recording layer in order to focus the radiation beam on the recording layer, and in that the core of the coil is radiation-transmitting and is mechanically coupled to the focusing means, the coil being arranged in such a way that the radiation beam is projected onto the recording layer via the core of the coil.

12. A recording apparatus as claimed in claims 5, 6, 7, 8, or 9, characterized in that the energizing circuit is adapted to generate energizing-current pulses of a duration which is short relative to a repetition time of the energizing-current pulses.

13. A method as claimed in claim 3 characterized in that a duration of the energizing-current pulses is small relative to a repetition time of the energizing-current pulses.

* * * * *